United States Patent
Yao et al.

(10) Patent No.: US 10,411,461 B2
(45) Date of Patent: Sep. 10, 2019

(54) PROTECTION CIRCUIT FOR BRUSHLESS DC MOTOR, AND CONTROL DEVICE

(71) Applicant: GREE ELECTRIC APPLIANCES, INC. OF ZHUHAI, Zhuhai, Guangdong (CN)

(72) Inventors: Lina Yao, Guangdong (CN); Weilin Guo, Guangdong (CN); Wenxian Wu, Guangdong (CN); Anyong Hu, Guangdong (CN)

(73) Assignee: GREE ELECTRIC APPLIANCES, INC. OF ZHUHAI, Zhuhai, Guangdong (CN)

( * ) Notice: Subject to any disclaimer, the term of this patent is extended or adjusted under 35 U.S.C. 154(b) by 0 days.

(21) Appl. No.: 15/777,984

(22) PCT Filed: Sep. 19, 2016

(86) PCT No.: PCT/CN2016/099323
§ 371 (c)(1),
(2) Date: May 22, 2018

(87) PCT Pub. No.: WO2017/088566
PCT Pub. Date: Jun. 1, 2017

(65) Prior Publication Data
US 2018/0351348 A1 Dec. 6, 2018

(30) Foreign Application Priority Data
Nov. 24, 2015 (CN) .......................... 2015 1 0824831

(51) Int. Cl.
*H02H 7/08* (2006.01)
*H02H 7/20* (2006.01)
(Continued)

(52) U.S. Cl.
CPC ........ *H02H 7/0811* (2013.01); *H02H 1/0007* (2013.01); *H02P 6/28* (2016.02)

(58) Field of Classification Search
CPC .... H02H 3/08; H02H 3/06; H02H 7/08; F24F 1/08; F25B 49/025
See application file for complete search history.

(56) References Cited

U.S. PATENT DOCUMENTS

| | | | |
|---|---|---|---|
| 4,208,621 A | 6/1980 | Hipkins et al. | |
| 2009/0097179 A1* | 4/2009 | Chen | H02H 3/093 361/87 |
| 2010/0320946 A1* | 12/2010 | Ueda | H02P 6/12 318/400.3 |

FOREIGN PATENT DOCUMENTS

| | | |
|---|---|---|
| CN | 202798550 U | 3/2013 |
| CN | 103269143 A | 8/2013 |

(Continued)

OTHER PUBLICATIONS

WIPO, International Search Report dated Dec. 20, 2016.

*Primary Examiner* — Eduardo Colon Santana
*Assistant Examiner* — Said Bouziane
(74) *Attorney, Agent, or Firm* — Li & Cai Intellectual Property (USA) Office

(57) ABSTRACT

Provided are a protection circuit for a brushless DC motor, and a control device. The protection circuit is applied to a control device for a brushless DC motor, the control device including a main control chip and a protection circuit for driving a brushless DC motor. The protection circuit includes a sampling signal input end (RNF), a first resistor (R1), a first capacitor (C1), a second capacitor (C2), a comparator (IC2) and a switching element (IC1), connected together in a preset structure.

11 Claims, 2 Drawing Sheets

(51) Int. Cl.
*H02P 6/28* (2016.01)
*H02H 1/00* (2006.01)

(56) References Cited

FOREIGN PATENT DOCUMENTS

| CN | 203481796 U | 3/2014 |
| CN | 105262061 A | 1/2016 |
| CN | 205141642 U | 4/2016 |

* cited by examiner

PROTECTION CIRCUIT FOR BRUSHLESS DC MOTOR, AND CONTROL DEVICE

TECHNICAL FIELD

The present invention claims benefit of Chinese Patent Application No. 201510824831.5, entitled "protection circuit for brushless DC motor, and control device", filed to China Patent Office on Nov. 24, 2015, the contents of which are hereby incorporated by reference in its entirety.

BACKGROUND

The operation of a brushless DC motor relies on a control device to input multiple PWM driving signals through power components. During operation, the brushless DC motors may experience over-current or short-circuit due to load or failure. In a case that over-current or short-circuit faults occur, large currents may be generated. The large currents may damage a main control device and even burn the power components down. If the output of the multiple PWM driving signals of the power components can be cut off timely in a case that over-current or short-circuit occurs in the brushless DC motor, it is possible to prevent a large current from causing an irreversible damage to a control device.

SUMMARY

According to one embodiment of the present invention, a protection circuit for a brushless DC motor is applied to a control device for the brushless DC motor. The protection circuit includes:

a sampling signal input end for receiving a current signal of the brushless DC motor;

a first resistor having an end connected to the sampling signal input end;

a first capacitor having an end connected to the other end of the first resistor, the other end of the first capacitor being grounded;

a comparator having a non-inverting input end connected to the other end of the first resistor, an inverting input end of the comparator is used for receiving a reference voltage;

a switching element having a control end connected to an output end of the comparator, the switching element is turned on in a case that the control end receives a high-level signal;

a fault signal output end for connecting a fault signal input end of a main control chip of the control device; and a second capacitor having an end connected to the fault signal output end, the other end of the second capacitor being grounded, wherein a signal input end of the switching element is connected to the fault signal output end, and a signal output end is grounded.

In an embodiment of the disclosure, the switching element includes a relay or a triode.

In an embodiment of the disclosure, the switching element is a Metal Oxide Semiconductor (MOS) transistor, the protection circuit further including:

a second resistor having an end connected to the fault signal output end, the other end of the second resistor being connected to the control end.

In an embodiment of the disclosure, the protection circuit further includes a power supply circuit for supplying power to the fault signal output end.

In an embodiment of the disclosure, the power supply circuit includes:

a voltage input end for receiving a driving voltage; and a third resistor having an end connected to the voltage input end, the other end of the third resistor being connected to the fault signal output end.

In an embodiment of the disclosure, the protection circuit further includes a voltage division circuit for outputting the reference voltage to the inverting input end of the comparator.

In an embodiment of the disclosure, the voltage division circuit includes:

a divided voltage input end for receiving a driving voltage;

a fourth resistor having an end connected to the divided voltage input end, the other end of the fourth resistor being connected to the non-inverting input end of the comparator; and a fifth resistor having an end connected to the other end of the fourth resistor, the other end of the fifth resistor being grounded.

In an embodiment of the disclosure, the protection circuit further includes:

a third capacitor having an end connected to the other end of the fourth resistor, the other end of the third capacitor being grounded.

A control device includes a main control chip for controlling a brushless DC motor. In an embodiment of the disclosure, the control device further includes:

the above-mentioned protection circuit connected to the main control chip.

BRIEF DESCRIPTION OF THE DRAWINGS

In order to more clearly describe the technical solutions in the embodiments of the disclosure or the related art, accompanying drawings needing to be used in the descriptions of the embodiments or the related art will be briefly introduced below. Obviously, the drawings described below are merely some embodiments of the disclosure. Without making creative works, a person of ordinary skill in the art may also obtain other drawings according to these drawings.

DETAILED DESCRIPTION OF THE EMBODIMENTS

The following clearly describes the technical solutions in the embodiments of the disclosure with reference to the accompanying drawings in the embodiments of the disclosure. The described embodiments are merely some but not all of the embodiments of the disclosure. All other embodiments obtained by a person of ordinary skill in the art based on the embodiments of the disclosure without making creative efforts shall fall within the protection scope of the disclosure.

Embodiment 1

Figure 1:
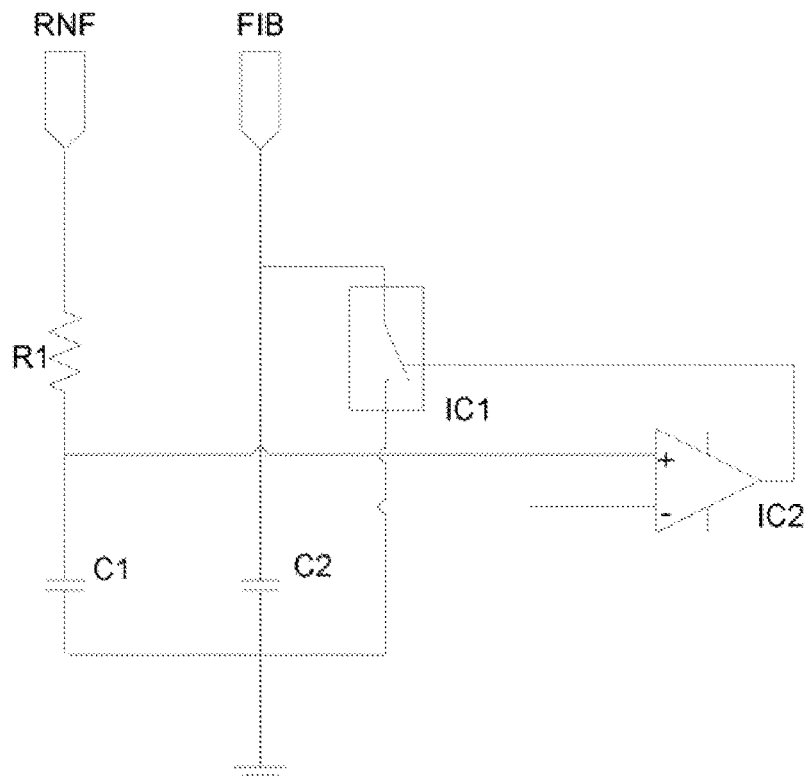
FIG. 1 is a circuit diagram of a protection circuit for a brushless DC motor according to an embodiment of the disclosure.

FIG. 1 is a circuit diagram of a protection circuit for a brushless DC motor according to an embodiment of the disclosure.

As shown in FIG. 1, the protection circuit provided in the present embodiment is applied to a control device for a brushless DC motor, and is connected to a main control chip of the control device. Specifically, it includes a sampling signal input end RNF, a first resistor R1, a first capacitor C1, a second capacitor C2, a comparator IC2, and a switching element IC1.

Herein, the sampling signal input end RNF is used to receive a current signal of the brushless DC motor, and the current signal is collected by a current sensor of the brushless DC motor and is converted into a standard current signal, for example, 0-5 volts.

One end of the first resistor R1 is connected to the sampling signal input end RNF, one end of the first capacitor C1 and a non-inverting input end of the comparator IC2 separately, and the other end of the first capacitor C1 is grounded.

An inverting input end of the comparator IC2 is used to receive a preset reference voltage, which is used as a protection threshold of the protection circuit. A signal output end of the comparator IC2 is connected to a control end of the switching element IC1. In a case that the voltage of the current signal received by the sampling signal input end RNF exceeds the reference voltage, the comparator IC2 outputs a high-level signal through its signal output terminal.

A fault signal output end FIB is used to connect a fault signal input end of the main control chip. The fault signal output end FIB is connected to one end of the second capacitor C2 and a signal input end of the switching element IC1, the other end of the second capacitor C2 is grounded, and a signal output end of the switching element IC1 is also grounded. In a case that the control end of the switching element IC1 is loaded with a high-level signal, the switching element IC1 conducts its signal input end and its signal output end.

The switching element IC1 may be specifically selected from a relay, a transistor, or an MOS transistor.

In a case that a voltage value of a sampling signal does not exceed the protection threshold, the comparator IC2 outputs a low level, the switching element IC1 is turned off, the second capacitor C2 is charged through the fault signal output end, and the voltage of the second capacitor C2 gradually rises to a high level. At this time, the main control chip normally outputs 6 PWM driving signals through its signal output end, and the brushless DC motor works normally.

In a case that a voltage value of a sampling signal exceeds the protection threshold, the comparator IC2 outputs a high level, the switching element IC1 is turned on, the amount of electricity stored in the second capacitor C2 is discharged by means of the signal output end of the switching element IC1, the voltage of the fault signal output end FIB rapidly reduces to a low level, and the main control chip switches off the output of 6 PWM driving signals thereof.

The size of the capacitance of the second capacitor C2 determines the charging and discharging time of the capacitor. The charging and discharging time may be controlled by changing the capacitance of the second C2, thereby controlling the duration of the main control chip turning off and outputting the driving signal.

The continuity of short-circuit of the brushless DC motor is taken as an example. In a case that the voltage value of the sampling signal reflecting the current of the brushless DC motor is higher than the protection threshold, the second capacitor C2 is discharged, the voltage on the second capacitor C2 is changed from a high level to a low level rapidly, the master chip no longer outputs a PWM driving signal, and the current of the brushless DC motor rapidly decreases; accordingly, the voltage value of the sampling signal is lower than the protection threshold, the second capacitor C2 starts to charge, the voltage on the second capacitor C2 rises gradually from a low level to a high level, a voltage signal at the fault signal output end FIB rises to a high level, the main control chip starts outputting a PWM driving signal again, and the brushless DC motor generates a large current again. There is a constant cycle between protection start and protection stop.

It is assumed that the filter charging time of the first resistor R1 and the first capacitor C1 is T1, the response and delay time of the comparator IC2 is T2, the on-time of the switching element IC1 is T3, the off-time is T4, the discharging time of the second capacitor C2 is T5, and the charging time is T6, where the total time of T1, T2, T3, and T5 must be less than the time in a case that a power module of the main control device can withstand a large current caused by short circuit, and the level of the fault signal output end FIB is pulled down within this time range. The total time of T1, T2, T4, and T6 must meet heat dissipation requirements of the power module, so as to avoid damage to the power module due to high temperature in a case of continuous cycling under a heavy current.

From the above technical solution, it can be seen that the present embodiment provides a protection circuit for a brushless DC motor. The protection circuit is applied to a control device for a brushless DC motor, the control device including a main control chip and a protection circuit for driving a brushless DC motor. The protection circuit includes a sampling signal input end RNF, a first resistor R1, a first capacitor C1, a second capacitor C2, a comparator IC2 and a switching element IC1, connected together in a preset structure. In a case that a voltage value of a sampling signal exceeds a protection threshold, the comparator IC2 outputs a high level, the switching element IC1 is turned on, the amount of electricity stored in the second capacitor C2 is discharged by means of a signal output end of the switching element IC1, the voltage of a fault signal output end FIB rapidly reduces to a low level, the main control chip switches off the output of 6 PWM driving signals thereof, i.e. stops driving the brushless DC motor, and then the brushless DC motor stops generating a large current, thereby avoiding damage to the control device caused by the large current.

Figure 2:
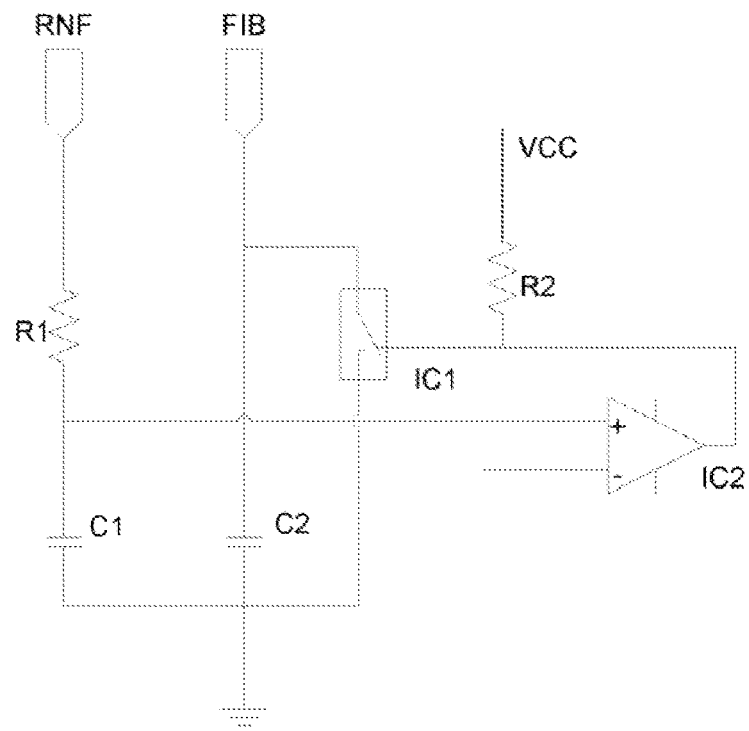
FIG. 2 is a circuit diagram of another protection circuit for a brushless DC motor according to an embodiment of the disclosure.

In a case that an MOS transistor is selected as the switching element, a second resistor R2 as a pull-up resistor needs to be externally connected to its control end, as shown in FIG. 2 specifically.

Figure 3:
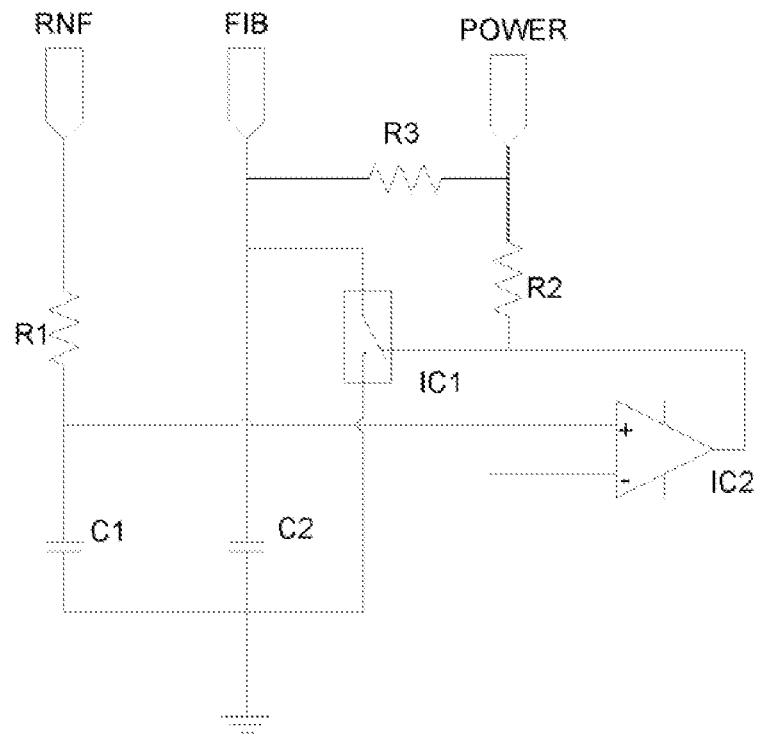
FIG. 3 is a circuit diagram of yet another protection circuit for a brushless DC motor according to an embodiment of the disclosure.

In a case that the main control chip is not connected to a power supply at its fault signal input end, the protection circuit also needs to provide a power supply circuit for supplying power to the fault signal input end. The power supply circuit includes a voltage input end POWER and a third resistor R3. The voltage input end POWER for receiving external power is connected to the fault signal output end FIB through the third resistor R3, as shown in FIG. 3 specifically.

Embodiment 2

Figure 4:
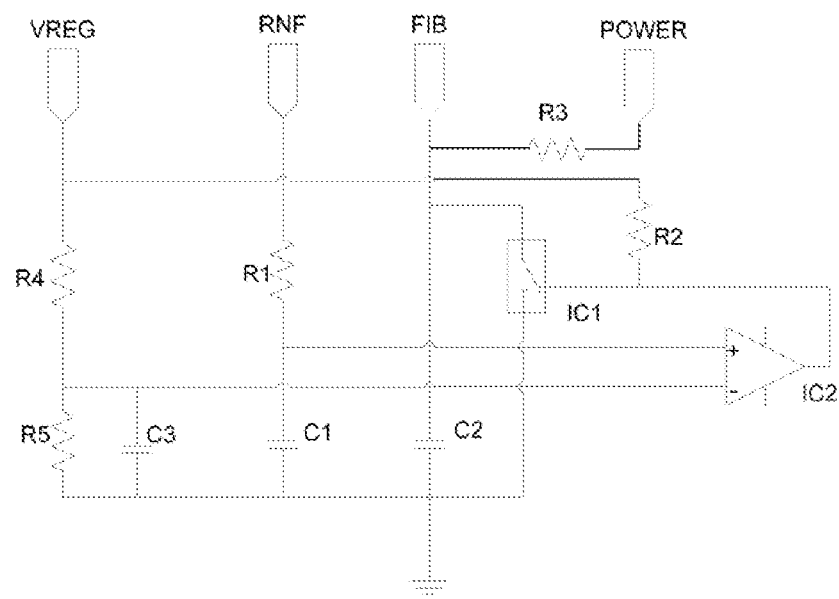
FIG. 4 is a circuit diagram of a protection circuit for a brushless DC motor according to another embodiment of the disclosure.

FIG. 4 is a circuit diagram of a protection circuit for a brushless DC motor according to another embodiment of the disclosure.

As shown in FIG. 4, in the present embodiment, a voltage division circuit is added on the basis of the previous embodiment. The voltage division circuit is used to provide a reference voltage for the comparator. The advantage of using the voltage division circuit is that a required reference voltage may be conveniently obtained by adjusting the resistance and ratio of the voltage division circuit. The voltage division circuit includes a divided voltage input end VREG, a fourth resistor R4 and a fifth resistor R5.

The divided voltage input end VREG is used to receive a driving voltage, and is connected to one end of the fourth resistor R4, the other end of the fourth resistor R4 is connected with an inverting input end of the comparator IC2 and one end of the fifth resistor R5 separately, and the other end of the fifth resistor R5 is grounded.

By adjusting the resistance and ratio of the fourth resistor R4 and the fifth resistor R5, a reference voltage output to the inverting input end of the comparator IC2 may be conveniently adjusted.

In addition, in order to filter out clutter, the present embodiment further provides a third capacitor C3 directly connected in parallel with the fifth resistor R5.

Embodiment 3

The present embodiment provides a control device for a brushless DC motor. The control device includes a main control chip and a protection circuit provided by the above embodiments.

Each embodiment in this specification is described in a progressive manner, and each embodiment focuses on the differences from other embodiments. The same or similar parts among the embodiments can be referred to each other. The above description of the disclosed embodiments enables those skilled in the art to implement or use the disclosure. Various modifications to these embodiments will be readily apparent to those skilled in the art, and the general principles defined herein may be applied to other embodiments without departing from the spirit or scope of the disclosure. Therefore, the disclosure will not be limited to these embodiments shown herein, but it is to comply with the broadest scope consistent with the principles and novel features disclosed herein.

What is claimed is:

1. A protection circuit for a brushless DC motor, applied to a control device for the brushless DC motor, the protection circuit comprising:
    a sampling signal input end for receiving a current signal of the brushless DC motor;
    a first resistor having an end connected to the sampling signal input end;
    a first capacitor having an end connected to the other end of the first resistor, the other end of the first capacitor being grounded;
    a comparator having a non-inverting input end connected to the other end of the first resistor, an inverting input end of the comparator is used for receiving a reference voltage;
    a switching element having a control end connected to an output end of the comparator, the switching element is turned on in a case that the control end receives a high-level signal;
    a fault signal output end for connecting a fault signal input end of a main control chip of the control device; and
    a second capacitor having an end connected to the fault signal output end, the other end of the second capacitor being grounded,
    wherein a signal input end of the switching element is connected to the fault signal output end, and a signal output end is grounded.

2. The protection circuit as claimed in claim 1, wherein the switching element comprises a relay or a triode.

3. The protection circuit as claimed in claim 2, further comprising power supply circuit for supplying power to the fault signal output end.

4. The protection circuit as claimed in claim 1, wherein the switching element is a Metal Oxide Semiconductor (MOS) transistor, the protection circuit further comprising:
    a second resistor having an end connected to the fault signal output end, the other end of the second resistor being connected to the control end.

5. The protection circuit as claimed in claim 4, further comprising power supply circuit for supplying power to the fault signal output end.

6. The protection circuit as claimed in claim 1, further comprising power supply circuit for supplying power to the fault signal output end.

7. The protection circuit as claimed in claim 6, wherein the power supply circuit comprises:
    a voltage input end for receiving a driving voltage; and
    a third resistor having an end connected to the voltage input end, the other end of the third resistor being connected to the fault signal output end.

8. The protection circuit as claimed in claim 6, further comprising a voltage division circuit for outputting the reference voltage to the inverting input end of the comparator.

9. The protection circuit as claimed in claim 8, wherein the voltage division circuit comprises:
    a divided voltage input end for receiving a driving voltage;
    a fourth resistor having an end connected to the divided voltage input end, the other end of the fourth resistor being connected to the non-inverting input end of the comparator; and
    a fifth resistor having an end connected to the other end of the fourth resistor, the other end of the fifth resistor being grounded.

10. The protection circuit as claimed in claim 9, further comprising:
    a third capacitor having an end connected to the other end of the fourth resistor, the other end of the third capacitor being grounded.

11. A control device, comprising a main control chip for controlling a brushless DC motor, the control device further comprising:
    a protection circuit connected to the main control chip, as claimed in claim 1.

* * * * *